United States Patent Office 3,519,458
Patented July 7, 1970

3,519,458
METHOD FOR REDUCING THE CORROSION SUSCEPTIBILITY OF FERROUS METAL HAVING FLUXING AGENT RESIDUE
Werner Rausch, Stierstadt, Taunus, Germany, assignor to Hooker Chemical Corporation, Niagara Falls, N.Y., a corporation of New York
No Drawing. Filed Feb. 23, 1967, Ser. No. 617,793
Claims priority, application Germany, Mar. 1, 1966, 1,521,869
Int. Cl. C23f *11/00;* C23g *1/14*
U.S. Cl. 117—6                      4 Claims

---

ABSTRACT OF THE DISCLOSURE

A process for treating ferrous metal surfaces contaminated with a welding or soldering flux wherein such surfaces are contacted with a composition containing an organic amine having a solubility in water of at least 0.5 gram per liter and a pK value in excess of 7 and an organic dissolving or solvating aid which is soluble in both water and mineral oil. Suitable amines which may be used are the alkanol amines, such as mono-, di-, and triethanolamine, while suitable dissolving aids include ethoxylated materials such as butylmonoglycol ether and alcohols such as cyclohexanol. These compositions may be applied to the ferrous surfaces containing fluxing agent residues by brushing, spraying, or the like processes, and may be retained on the surface until it is subjected to the normal aqueous cleaning process prior to further metal treatment, such as phosphating, lacquering or the like.

---

This invention relates to a process for treating ferrous metal surfaces and, more particularly it relates to a method for treating ferrous metal surfaces contaminated with a welding or soldering flux so as to reduce the corrosion susceptibility of said surfaces.

In the manufacture of objects from ferrous metal, for example steel, such as steel plate, the use of tin and lead-tin soldering is quite prevalent. For example, such solder serves to connect the individual construction elements to each other, as well as, to fill in or smooth holes, fissures, blisters, and the like in the metal surfaces. Generally, in such processes, to provide good adhesion between the solder and the steel base, it is the practice to treat the steel base with a fluxing material before and/or during the soldering process. Typically, the fluxing materials used contain considerable quantities of chlorides, such as ammonium chloride or zinc chloride.

It has been found that where residues of the fluxing agents are left on the steel surface after the soldering operation, there is a latent danger of rust formation taking place. The rust which is caused by such flux residues is particularly dangerous in that it corrodes deeply into the metal surface, frequently in a very short time, and often occludes water-soluble salts, such as chlorides and the like, which add further to the rusting. Moreover, lacquer films which have been applied above the rust site are found to lose their adhesion, with resulting blistering, while the rust sites form the starting point for further sub-rusting of the lacquer film. Similar decomposition phenomena have also been observed on or below metal plating which has been galvanically deposited on such steel surfaces. Thus, it is seen that where there has not been a substantially complete removal of the flux from the steel surfaces, before subsequent surface treatment such as phosphating, lacquering, plating, or the like, an appreciable deleterious effect on the corrosion resistance obtained can take place.

In the past, it has been recommended that to avoid these difficulties these fluxing agent residues be removed from the steel surfaces as soon as possible after the soldering or welding process. Generally, this has been done by grinding off the flux residues from the metal surface or by pickling the entire metal surface to effect removal of these residues. In both instances, however, an appreciable expenditure of labor is required to effect the desired removal so that, at the present time, there is a need for an easier process, wherein the fluxing agent residues can remain on the steel surfaces.

It is, therefore, an object of the present invention to provide an improved process for treating ferrous metal surfaces which contain soldering or welding flux residues, whereby the susceptibility of said surfaces to corrosion is minimized.

A further object of the present invention includes a method for treating ferrous metal surfaces containing soldering of welding flux residues, whereby the corrosio susceptibility of such surfaces may be minimized without the necessity for the removal of the flux residue from the surface.

These and other objects will become apparent to those skilled in the art from the description of the invention which follows.

Pursuant to the above objects, the present invention includes a method for treating ferrous metal surfaces contaminated with welding and/or soldering flux residues to minimize rust formation resulting from such residues which comprises applying to said ferrous metal surface a composition which comprises at least one organic amine having a water-solubility of at least 0.5 gram per liter and a pK value greater than 7 and at least one organic dissolving aid, which is soluble both in water and in mineral oil, the dissolving aid being present in the composition in an amount such that the composition is at least partially soluble both in water and in mineral oil and is capable of wetting metal surfaces coated either with water or with mineral oil. This composition may be applied to ferrous metal surfaces, such as steel surfaces, which are contaminated with the fluxing agent residues, in the form of a liquid or paste-like material. As such, it is found to be effective in preventing or at least minimizing the corrosion of such surfaces, as for example by rusting, which is caused by the fluxing material residues on the surface, prior to the further processing of these surfaces, as for example by phosphating, lacquering, plating, or the like.

More specifically, in the practice of the present invention, the ferrous metal surfaces contaminated with welding or soldering flux residues are treated with a corrosion inhibiting composition, in the form of a liquid or paste, which contains at least one organic amine having a solubility of at least 0.5 gram per liter in water and a pK value greater than 7, and at least one organic dissolving aid. Desirably, the corrosion inhibiting compositions used contain the amine in an amount such that the basic nitrogen content of the composition is at least about 1% by weight. Preferably, the corrosion inhibiting compositions contain the amine in amounts within the range of about 10 to about 80% by weight and the organic dissolving aid in amounts within the range of about 20 to 90% by weight.

In choosing the organic amine for use in the present composition, as has been noted hereinabove, they should have a water solubility of at least about 0.5 gram per liter and a pK value which is greater than 7. The pK value applies to the splitting off of the proton from the corresponding ammonium ion according to the following equation:

$$\equiv NH^+ \rightleftarrows \equiv N + H^+$$

Thus, $$K = \frac{[\equiv N] \cdot [H^+]}{[\equiv NH^+]}$$

and $pK = -\log K$. Accordingly, it is seen that pK corresponds to the pH value wherein 50% of the total amine is present in the solution as the ammonium ion $$([\equiv N] = [\equiv NH^+])$$

Typically, the organic amines which may be used are the mono-, di-, tri-, tetra-, and the like substituted alkyl and alkanol amine, including the monoamines, diamines, triamines, tetraamines, pentamines and the like. Desirably, the alkyl and alkanol substituent groups on these amines will contain from about 1 to about 6 carbon atoms in either a straight or branched chain. Exemplary of the organic amines which are suitable, and the physical characteristics of each are the following:

|  | B.P. at 760 mm. (° C.) | N (percent) | pK at 25° C. | Solubility in water |
|---|---|---|---|---|
| Dibutylamine | 159 | 10.9 | 10.6 | Average. |
| Diisobutylamine | 160 | 10.9 | 10.6 | Good. |
| Tripropylamine | 156 | 10.7 | 10.7 | Do. |
| n-Diamylamine | 203 | 9.0 | 10.6 | Low. |
| Tributylamine | 214 | 7.6 | 10.4 | Do. |
| Diethylenetriamine | 206 | 41.0 | 7 | Good. |
| Triethylenetetramine | 378 | 38.5 | 7 | Do. |
| Tetraethylene pentamine | 340 | 37.0 | 7 | Do. |
| Ethanolamine | 172 | 23.0 | 9.5 | Do. |
| Diethanolamine | 268 | 13.0 | 8.8 | Do. |
| Triethanolamine | 277 | 9.4 | 7.7 | Do. |

Of the typical amines which have been set forth hereinabove, the alkanol amines, such as the mono-, di-, and tri-ethanolamines, have been found to be particularly suitable since they not only dissolve very well in water but additionally, unlike many of the other amines, are practically odorless.

The organic dissolving aids which are incorporated in the corrosion inhibitor composition of the present invention are those organic compounds which are soluble both in water as well as in mineral oil and include various alcohols and ethoxylated compounds, such as ethoxylated aryls, ethoxylated alkyls, and ethoxylated alkylaryls. Specifically preferred compounds of this type which may be used in the present method include cyclohexanol, butylmonoglycol ether, butyldiglycol ether, and polypropylene glycol ether. All of these materials have been found to have good solvating properties and for this reason are preferred. It is further to be noted that in choosing both the organic amines and the organic dissolving aids, it is desirable that the specific compounds used have a boiling point which is above about 150 degrees centigrade. By choosing materials having such boiling points, the premature vaporization of the corrosion inhibiting composition of the present invention from the metal surface is prevented.

In addition to the organic dissolving aids as has been described hereinabove, the compositions of the present invention may also contain wetting agents, corrosion inhibitors such as condensation products of oleic acid with di- or tri-ethanolamine, and various hydrocarbons, such as petroleum. Moreover, the compositions of the present invention may be made pasty or thixotropic by the addition of various thickening agents, as are known in the art, so that the composition will not run off of the metal when they are applied to vertical or other non-horizontal surfaces.

The compositions of the present invention may be applied to the steel surfaces contaminated with the flux residues in any convenient manner, as for example, by brushing, spraying, or the like. Desirably, the compositions are applied relatively soon after the metal surfaces are contaminated with the fluxing material residue. In this manner, the length of time the flux residues are in contact with the untreated metal, and hence the amount of corrosion or rusting which will be caused, will be minimized.

Once the corrosion inhibiting compositions of the present invention have been applied to the metal surfaces, they may be retained thereon until such time as the metal is subjected to additional processing, such as phosphating, lacquering, plating, or the like. Inasmuch as the present compositions have appreciable water solubility, the removal of these compositions from the metal surface is greatly facilitated when the metal surfaces are subjected to the customarily used aqueous cleaning solutions, applied by dipping or spraying for removing grease and dirt prior to further processing of the metal surface. Additionally, it is found that because of the solvating action of the corrosion inhibiting compositions for hydrocarbons, the presence of the subject compositions on the metal surface during the cleaning operation aids in the removal of oil and grease contaminants, which may also be on the metal surface. It is to be appreciated that the cleaning process may be followed by various chemical surface treatments, such as phosphating, oxalating, or the like, so as materially to improve the adhesion and corrosion resistance of a subsequently applied lacquer coating.

In order that those skilled in the art may better understand the present invention and the manner in which it may be practiced, the following specific examples are given. In these examples, unless otherwise indicated, parts and percents are by weight. It is to be appreciated, however, that these examples are merely exemplary of the present invention and are not to be taken as a limitation thereof.

EXAMPLE 1

To steel plate, containing a residue of soldering flux, there was applied, by brushing, a composition containing 25 parts of tetraethylene pentamine and 75 parts of butyl diglycol ether. The thus-treated steel-plate was then stored for several weeks, in exposure to the atmosphere and after this, showed no evidence of rust formation on the surface. After this time the thus-treated steel plate was then subjected to a standard cleaning process, wherein the metal surface was sprayed with a commercial aqueous alkaline cleaning solution, prior to the application of a lacquer coating. It was found that in this cleaning process, the composition which had been applied to the metal surface was substantially completely removed and, upon lacquering, there was obtained a smooth uniform lacquer coating on the metal surface which showed no evidence of rust or corrosion under the lacquer film.

By way of contrast, a similar steel plate which had not been treated with the composition of the present invention was also stored in exposure to the atmosphere. It was found that after only several hours, rust formation was observed on the metal surface.

Using the procedure of the preceding example, additional tests were made using other corrosion inhibiting compositions falling within the present invention. In each instance, comparable results, in terms of the inhibition of corrosion of the metal surface were observed. The compositions used in the additional examples were as follows:

Example (parts by wt.)

| Components | 2 | 3 | 4 | 5 | 6 | 7 | 8 | 9 | 10 | 11 |
|---|---|---|---|---|---|---|---|---|---|---|
| Tetraethylenepentamine | 12.5 | | | 25 | 12.5 | 25 | | | | |
| Tributylamine | | 25 | 12.5 | | | | | | | |
| Diethanolamine | | | | | | | 50 | 25 | 20 | |
| Triethanolamine | | | | | | | | | | 18 |
| Butyl diglycol ether | 87.5 | 75 | 87.5 | | | 25 | 50 | 75 | 60 | 77 |
| Cyclohexanol | | | | 75 | 37.5 | | | | | |
| Polypropylene glycol ether | | | | | | | 25 | | | |
| Petroleum | | | | | 50 | 25 | | | 20 | |
| Oleic acid polydiethanolamine | | | | | | | | | | 5 |
| Total | 100 | 100 | 100 | 100 | 100 | 100 | 100 | 100 | 100 | 100 |

While there have been described various embodiments of the invention, the compositions and methods described are not intended to be understood as limiting the scope of the invention, as it is realized that changes therewithin are possible.

What is claimed is:

1. In a process wherein fluxing agents containing inorganic chlorides are applied to a ferrous metal surface, the surface is subsequently cleaned to remove the residues of such fluxing agents and given a protective coating, the improvement which comprises applying to the ferrous metal surface containing such fluxing agent residues, prior to the cleaning thereof, a composition which consists essentially of from about 10 to 80 percent by weight of at least one organic alkyl or alkanol amine having from 1 to 6 carbon atoms in the alkyl and alkanol groups thereof, said amines having a water solubility of at least 0.5 gram per liter and pK value greater than 7 and from about 20 to 90 percent by weight of at least one organic dissolving aid selected from butylmonoglycol ether, butyldiglycol ether, polypropylene glycol ether and cyclohexanol, the organic dissolving aid being present in a sufficient amount that the composition is soluble both in water and mineral oil and is able to wet metal surfaces coated with both water and oil, and, thereafter, cleaning the thus-treated surface with an aqueous alkaline cleaning solution.

2. The method as claimed in claim 1 wherein the organic amine and organic dissolving aid in the composition each have a boiling point which is in excess of about 150 degrees centigrade.

3. The method as claimed in claim 2 wherein the composition contains the organic amine in an amount sufficient to provide a basic nitrogen content in the composition of at least 1% by weight.

4. The method as claimed in claim 3 wherein the amine in the composition is selected from the group consisting of monoethanolamine, diethanolamine, and triethanolamine.

References Cited

UNITED STATES PATENTS

| 2,333,206 | 11/1943 | Sloan | 117—49 X |
| 2,512,949 | 6/1950 | Lieber | 117—127 X |
| 2,775,533 | 12/1956 | Healy | 117—127 X |
| 2,916,397 | 12/1959 | Chin et al. | 117—6 X |
| 3,154,438 | 10/1964 | Keller et al. | 148—6.2 X |
| 3,368,913 | 2/1968 | Ziehr et al. | 148—6.15 X |
| 3,438,799 | 4/1969 | Eck et al. | 117—49 |

ALFRED L. LEAVITT, Primary Examiner

J. R. BATTEN, Jr., Assistant Examiner

U.S. Cl. X.R.

117—49, 50, 53, 127; 148—6.14, 6.15; 106—14; 252—390, 392